United States Patent
Jolley et al.

(10) Patent No.: US 6,483,632 B1
(45) Date of Patent: Nov. 19, 2002

(54) MULTISTAGE OPTICAL AMPLIFIER WITH GAIN FLATTENING

(75) Inventors: Nigel Edward Jolley, Stortford (GB); Fiona Davis, Stortford (GB); Richard Edward Epworth, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/214,248
(22) PCT Filed: Jun. 25, 1997
(86) PCT No.: PCT/GB97/01701
§ 371 (c)(1), (2), (4) Date: Sep. 20, 1999
(87) PCT Pub. No.: WO97/50157
PCT Pub. Date: Dec. 31, 1997

(30) Foreign Application Priority Data

Jun. 26, 1996 (GB) .............................................. 9613413

(51) Int. Cl.⁷ .............................................. H04B 10/12
(52) U.S. Cl. .................................................. 359/337.4
(58) Field of Search ........................... 372/6, 194, 337, 372/337.1, 337.11, 337.12, 337.13, 337.2, 337.21, 337.22, 337.3, 337.4, 337.5, 341.1, 341.2; 359/194, 337.4, 341.4, 578, 341.31, 341.32, 341.33, 341.41, 341.42, 341.43, 341.44, 341.5

(56) References Cited

U.S. PATENT DOCUMENTS

| | | | | |
|---|---|---|---|---|
| 5,050,949 A | * | 9/1991 | DiGiovanni et al. | ........ 359/341 |
| 5,115,338 A | * | 5/1992 | DiGiovanni et al. | ........ 359/337 |
| 5,764,406 A | * | 6/1998 | Newhouse et al. | ......... 359/341 |
| 5,900,969 A | * | 5/1999 | Srivastava et al. | .......... 359/341 |
| 6,049,413 A | * | 4/2000 | Taylor et al. | ................ 359/337 |
| 6,055,092 A | * | 4/2000 | Sugaya et al. | .............. 359/337 |
| 6,157,481 A | * | 12/2000 | Sugaya et al. | .............. 359/337 |
| 6,172,803 B1 | * | 1/2001 | Masuda et al. | ............. 359/341 |
| 6,198,572 B1 | * | 3/2001 | Sugaya et al. | .............. 359/337 |
| 6,215,584 B1 | * | 4/2001 | Yang et al. | .................. 359/341 |

FOREIGN PATENT DOCUMENTS

| | | | | |
|---|---|---|---|---|
| GB | 2 310 094 | | 8/1997 | ........... H04B/10/18 |
| JP | 08248455 | | 9/1996 | ............. G02F/1/35 |
| JP | 09191303 A | * | 7/1997 | ............ H04J/14/00 |

OTHER PUBLICATIONS

Dentai et al., "Electrically Tunable Semiconductor Fabry–Perot Filter", IEEE Photonics Technology Letters, vol. 6, No. 5, May 1994, pp. 629–631.*
Desurvire, Emmanuel. "Erbium–Doped Fiber Amplifiers, Principles and Applications", 1994, pp. 469–472.*

(List continued on next page.)

Primary Examiner—Thomas H. Tarcza
Assistant Examiner—Deandra M. Hughes
(74) Attorney, Agent, or Firm—Lee, Mann, Smith, McWilliams, Sweeney & Ohlson

(57) ABSTRACT

A variable gain optical amplifier, in which homogeneous gain broadening is dominant, has first and second fixed gain rare-earth doped optical waveguide amplifiers (21, 23) optically in series together with an intervening variable attenuation optical attenuator (22). This arrangement circumvents the problem of gain tilt encountered when operating such amplifiers under variable gain conditions. An alternative form of the module has variable gain waveguide amplifiers, but these are co-regulated so that the aggregate of their gain at a wavelength within the gain spectrum is maintained constant. A further alternative form of module is employed in a concatenation of such modules. In such a concatenation, the gain of individual modules is allowed to vary, but the aggregate of the gain, at wavelength within the gain spectrum, of all the waveguide amplifiers of all the modules of the concatenation is maintained constant.

16 Claims, 6 Drawing Sheets

OTHER PUBLICATIONS

Jolley et al., "Out-of-band electronic gain clamping for a variable gain and output power EDFA with low dynaic gain tilt", OFC'97 Technical Digest, 1997, pp. 134–135.*

Zhou; "Power Management System Design Modelling of Optical Multi-Wavelength Transport Networks", IEEE, Nov. 28, 1994, pp. 1503–1507.

* cited by examiner

MULTISTAGE OPTICAL AMPLIFIER WITH GAIN FLATTENING

BACKGROUND OF THE INVENTION

This invention relates to optical amplifier modules in which homogeneous gain broadening is dominant, such as modules incorporating optically pumped rare-earth doped optical waveguide amplifiers.

Such optical amplifiers have an optical gain spectrum that is liable to depart significantly from flatness over the whole of its spectral range, not merely at the extremities of that range. For any particular example of such an amplifier, the shape of the gain spectrum is not uniquely defined, but changes significantly when the magnitude of the gain exhibited at any particular wavelength within its gain spectrum is changed. In an optical communication system using multiple wavelengths for the transmission of data, the gain spectrum of the amplifier results in different signal channels having a different optical gain. Whilst small differences in gain may be tolerable, significant differences in gain are common causing degradation to some of the optical signal channels. In principle these differences can be cancelled out to some degree using selective optical filtering. However, when the operating gain of the amplifier changes due to a change in the incoming optical signal power, or the demanded optical output power, the resulting change in amplifier gain causes a change in the gain spectrum shape.

Specifically, at low gain, the spectral gain characteristic shows a slight rounded peak at the short wavelength end of the characteristic spaced by a shallow trough from a much broader, and slightly higher, peak extending to the long wavelength end of the characteristic, this broader peak having a slight upward tilt towards its long wavelength end. As the gain is increased, the amplitude of the broad peak increases unevenly, with the result that its tilt is first evened out, and end. As the gain is increased, the amplitude of the broad peak increases unevenly, with the result that its tilt is first evened out, and then reversed. At the same time the amplitude of the short wavelength peak increases at a faster rate, overtaking the gain of the broad peak, and also broadening slightly to longer wavelengths. This change in the spectral gain characteristic consequent upon change of gain level is referred to as dynamic gain tilt. Because the effect is 'dynamic' it can not be compensated by optical filtering that is entirely passive. If dynamic gain tilt is present ,and is not compensated, then different signal channels of a wavelength division multiplexed (WDM) transmission system will be subject to different differential gain under different conditions, with the result that some channels may suffer significant degradation limiting system performance.

SUMMARY OF THE INVENTION

The present invention is directed to the circumvention of the problem of dynamic gain tilt.

According to a first aspect of the present invention there is provided a variable gain amplifier module having a gain spectrum in which homogeneous broadening is dominant, which amplifier module includes at least two optical gain-providing regions and at least one loss-providing region, wherein the loss provided by said at least one loss-providing region is substantially uniform across the gain spectrum and is electrically variable, and wherein the amplifier module includes gain regulation means adapted to maintain substantially constant the spectral gain characteristic of the amplifier module by maintaining substantially constant, at a selected wavelength within the gain spectrum of the amplifier module, the aggregate gain of all the gain-providing regions of the amplifier module.

One preferred form of module has two gain-providing regions with a variable loss-providing region optically between them.

According to a second aspect of the present invention there is provided a method of operating a variable gain amplifier module having a gain spectrum in which homogeneous broadening is dominant, and which amplifier module includes at least two optical gain-providing regions and at least one loss-providing region, wherein the loss provided by said at least one loss-providing region is substantially uniform across the gain spectrum and is electrically variable, in which method of operating the amplifier module substantial invariance of the spectral gain characteristic of the amplifier module is maintained by maintaining substantially constant, at a selected wavelength within the gain spectrum of the amplifier module, the aggregate gain of all the gain-providing regions of the amplifier module.

According to a third aspect of the present invention there is provided, in a wavelength division multiplexed transmission system, a method of amplification by an amplifier module of optical wavelength division multiplexed traffic transmitted along a transmission path from a transmitter to a receiver, in which module the traffic is operated on by the module in succession first to amplify it for a first time using a first fixed gain optical waveguide optical amplifier, next to attenuate it by an amount that is variable, and then to amplify it for a second time using a second fixed gain rare-earth doped optical waveguide optical amplifier, wherein the first and second amplifiers are amplifiers that, under variable gain operating conditions, exhibit gain tilt.

According to a fourth aspect of the present invention there is provided a wavelength division multiplexed transmission system having a concatenation of optical amplifier modules in a transmission path between a transmitter and a receiver, each of which amplifier modules of the concatenation is a variable gain amplifier module having a gain spectrum in which homogeneous broadening is dominant, each containing at least one optical gain-providing region and at least one loss-providing region, wherein the loss provided by said at least one loss-providing region is substantially uniform across the gain spectrum and is electrically variable, wherein the concatenation includes gain regulation means adapted to maintain, under changes in the partitioning of the gain between the individual amplifier modules of the concatenation, substantially constant the spectral gain characteristic of the concatenation by maintaining substantially constant, at a selected wavelength within the gain spectrum of the amplifier modules, the aggregate gain of all the optical gain-providing regions of the concatenation.

According to a fifth aspect of the present invention there is provided, in a wavelength division multiplexed transmission system having an optical transmitter optically coupled with an optical receiver via a transmission path that includes a concatenation of optical amplifier modules having a gain spectrum in which homogeneous broadening is dominant, each containing at least one optical gain-providing region and at least one loss-providing region that provides a loss that is substantially uniform across the gain spectrum of the gain-providing regions and is electrically variable, a method of operating the concatenation to provide it with a substantially invariant spectral gain characteristic by regulating the gain, at a selected wavelength within the gain spectrum of the concatenation, of the amplifier modules of the concatenation so as to maintain, under changes in the partitioning of the gain between the individual amplifier modules of the concatenation, the aggregate gain of all the optical gain-providing regions of the concatenation.

BRIEF DESCRIPTION OF THE DRAWINGS

There follows a description of a wavelength division multiplexed (WDM) transmission system having a plurality of optical amplifier modules embodying the invention in a preferred form in the transmission path between a transmitter and a receiver. The description refers to the accompanying drawings in which.

DESCRIPTION OF THE PREFERRED EMBODIMENTS

Figure 1:
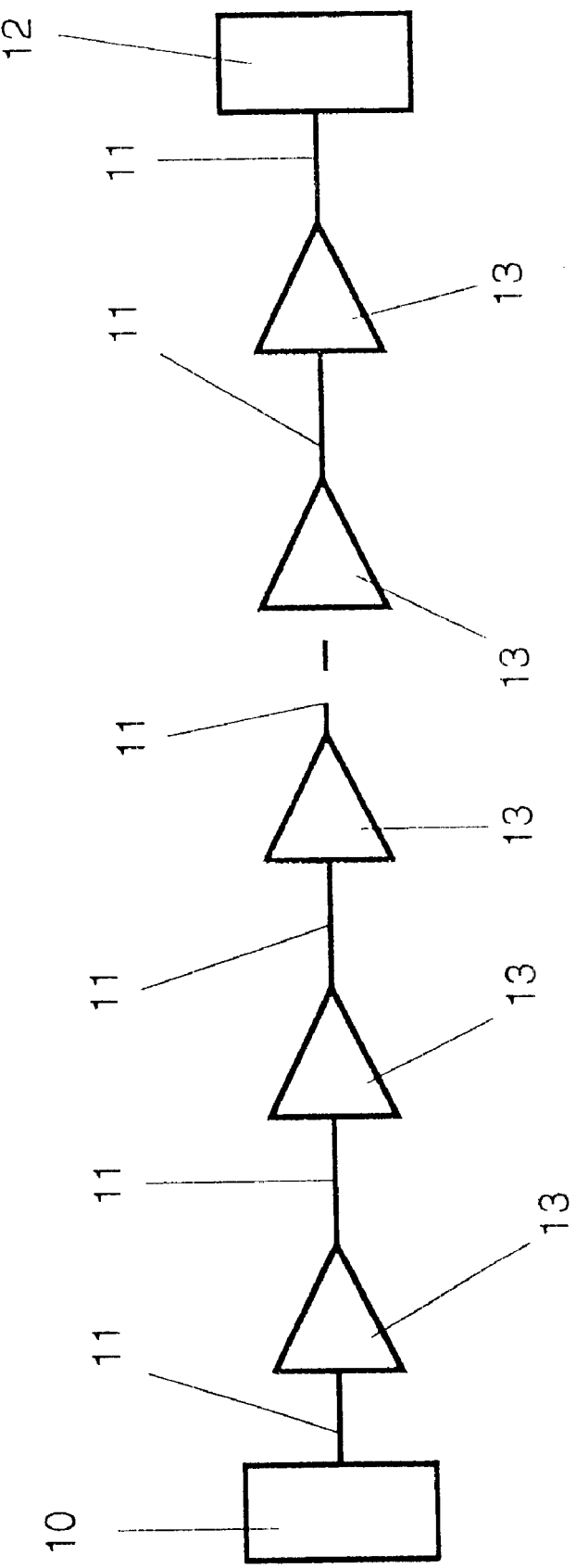
FIG. 1 is a block diagram of the WDM transmission system.

The transmission system of FIG. 1 comprises a WDM transmitter 10 typically arranged to launch a plurality of optical signals that are wavelength division multiplexed into one end of an optical fibre transmission path 11. At the far end of this path these signals are detected by a WDM receiver 12. At spaced intervals along the transmission path 11 are inserted a set of optical amplifier modules 13. Each optical amplifier module 13 includes at least one optical gain providing optically pumped rare-earth doped optical fibre amplifier.

Figure 2:
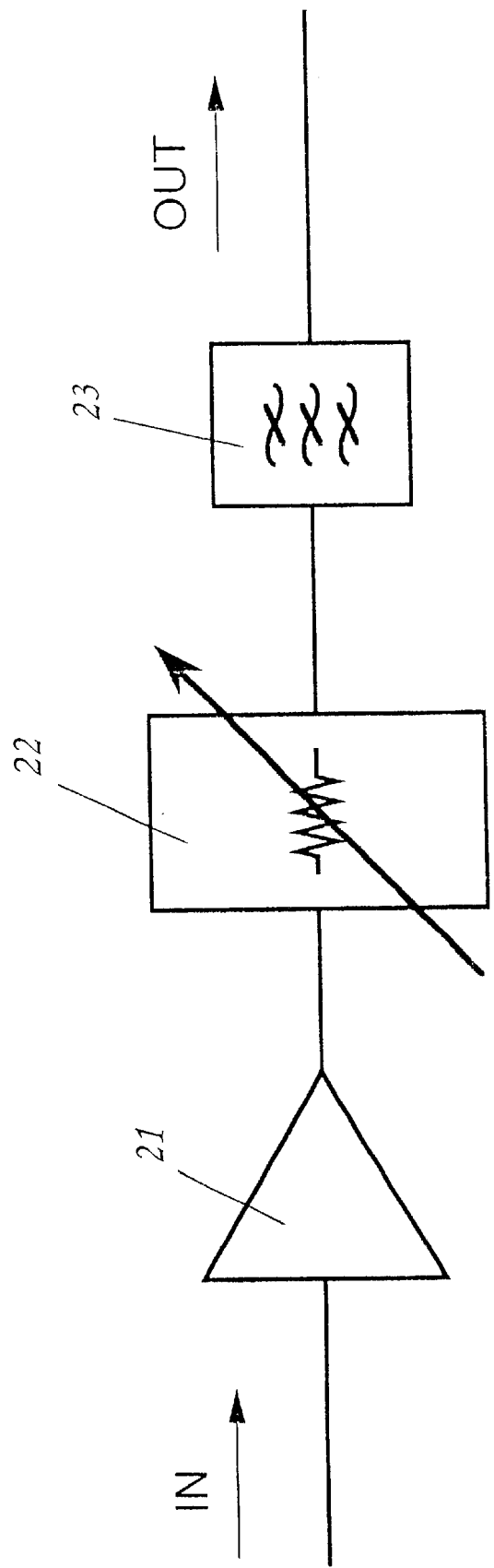
FIG. 2 is a block diagram of one example of one of the optical amplifier modules of the transmission system of FIG. 1, FIGS. 3 & 4 are block diagrams of the module of FIG. 2, connected respectively in a feed-forward and in a feed-back control environment.

The basic elements of a first preferred form of an amplifier module 13 of FIG. 1 is depicted in FIG. 2, and comprises a fixed gain rare-earth doped optical waveguide optical amplifier 21 and an electronically controllable variable attenuation optical attenuator 22. FIG. 2 shows the attenuator 22 located downstream of the amplifier 21, but alternatively it may be located upstream of it. Additionally the module 13 typically includes a passive gain-flattening filter 23 whose function is to smooth out the spectral gain characteristic of the fixed gain optical waveguide optical amplifier 21. The filter 23 may conveniently be a filter constructed in the manner described in EP 0 736 784 A and, though represented separately from the waveguide optical amplifier 21 in FIG. 2, in practice may be incorporated within it.

There are known ways of providing the amplifier 21 with fixed gain. A preferred way employs a supervisory laser (not shown) emitting at a wavelength, $\lambda_1$, within the amplification band but outside the signal band. The output of the supervisory laser is launched into the amplifier, and the amplitude of the portion of the output of the amplifier lying at the emission wavelength of the supervisory laser is measured. The amount of supervisory power launched into the amplifier is also measured, and a comparison of the two measures provides a measure of the gain provided by the amplifier at the supervisory laser wavelength. A feedback control loop adjusts the pump power to the amplifier to stabilise the value of this gain to a predetermined value. Stabilising the gain at one wavelength, in this instance the emission wavelength, $\lambda_1$, of the supervisory laser, stabilises the gain values at all other wavelengths in a manner that is nominally independent of the input signal power levels so long as there is sufficient pump power available.

An alternative preferred method of clamping the gain of the amplifier 21 employs a pair of narrow-band reflectors, typically Bragg reflectors, located respectively at the upstream and downstream ends of the amplifier waveguide so as to combine to form a Fabry Pérot laser cavity lasing at a wavelength, $\lambda_1$, within the amplification band but outside the signal waveband. The laser oscillation means that the round-trip amplifier gain at the laser oscillation wavelength is unity. This round-trip gain is determined in part by the reflectivity of the reflectors and in part by the (single transit) gain of the amplifier, and so that gain of the amplifier at this wavelength can be set to a desired value by choice of appropriate reflectivity values for the reflectors. Once the gain at the laser oscillation wavelength is fixed, the gain at other wavelengths is nominally maintained to be fixed so long as there is sufficient pump power available.

One form that the variable attenuation optical attenuator may take comprises a fibre-pigtailed module in which a linear variable neutral-density filter is mounted on a high precision linear sliding motor. Such a module is marketed by Santec under the designation OVA-610.

Figure 4:
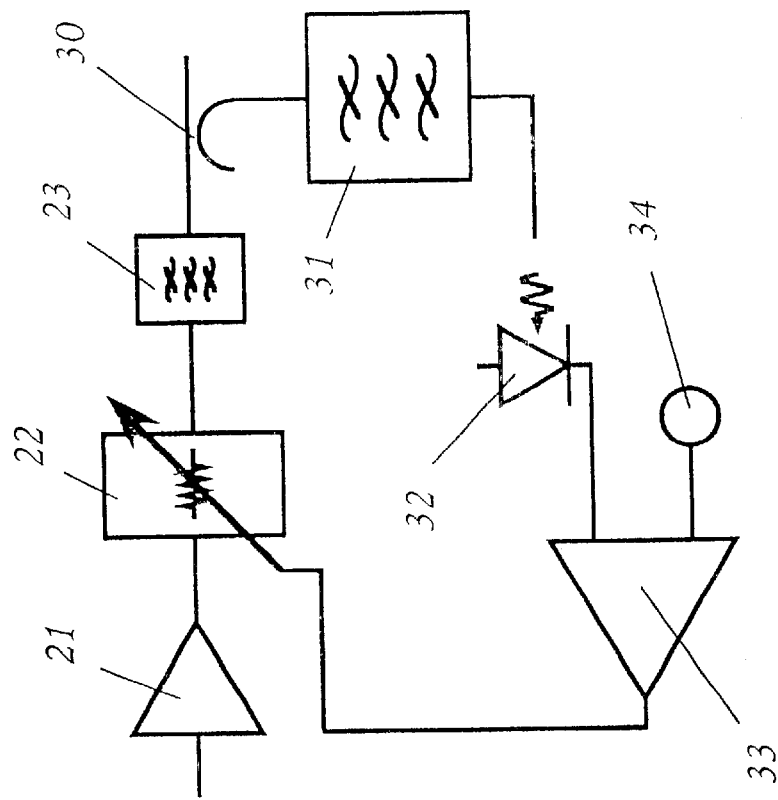
Figure 3:
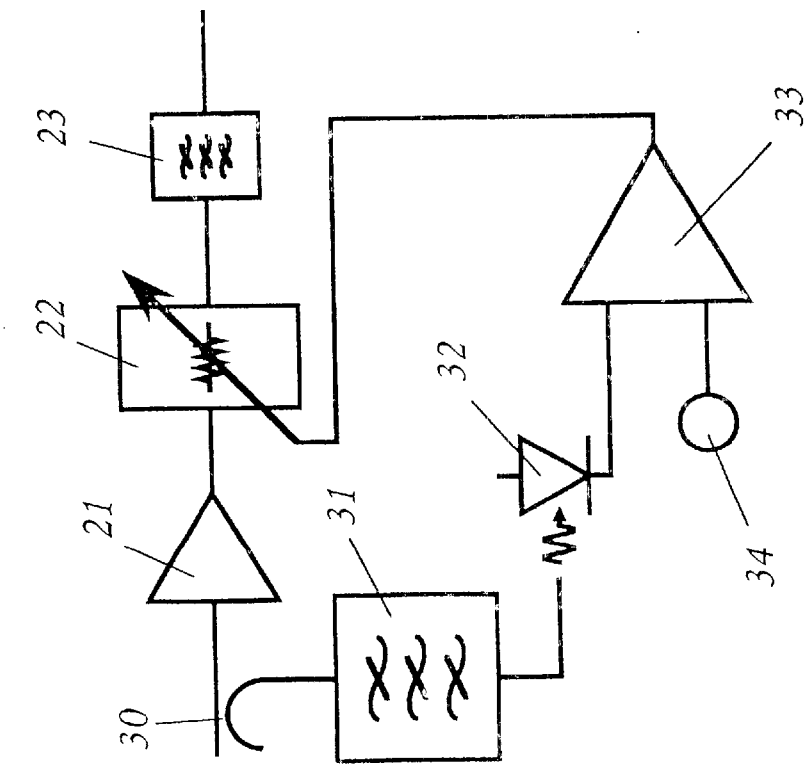

Regulation of the overall gain provided by the amplifier module is provided by regulation of the optical attenuation provided by its optical attenuator 22. Such regulation may for instance comprise feed-forward regulation in which the magnitude of the gain of the amplifier module is determined by the amplitude of the signal power applied to it, or it may comprise feed-back regulation in which the magnitude is determined by the amplitude of the signal power delivered by the module. The basic components of the feed-forward and feed-back regulation configurations are depicted respectively in FIGS. 3 and 4. In each case an optical tap 30 taps a small proportion of the optical power flowing through the amplifier and feeds it via an optical filter 31 to a photodetector 32. The output of the photodetector is fed to a differential amplifier 33 where it is compared with a reference level applied to terminal 34. The output of the differential amplifier is then applied as a control signal regulating the optical attenuation provided by the attenuator 22.

In FIG. 2 the amplifier module 13 is specifically depicted with its attenuator 22 located downstream of its optical waveguide amplifier 21. This may be considered the preferred arrangement because the input optical signal power to the module is typically quite low, and hence it is generally preferable, having regard to signal-to-noise considerations, to amplify the input signal before attenuating it rather than performing these operations in the reverse order. However, from module power output considerations it may be seen as desirable for the output of the module to be taken direct from the output of its optical waveguide amplifier rather than from that of its attenuator. Some way towards resolving these conflicting objectives is offered by the amplifier module depicted in FIG. 5. The basic elements of this amplifier module of FIG. 5 comprise, connected optically in cascade, a first fixed gain rare-earth doped optical waveguide amplifier 51, a variable attenuation optical attenuator 52, and a second fixed gain rare-earth doped optical waveguide amplifier 53. The attenuator 52 of FIG. 5 performs the same function as the attenuator 22 of FIG. 2, and so these attenuators may be identical. Like the waveguide amplifier 21 of FIG. 2, the waveguide amplifiers 51 and 53 are typically doped with erbium. The module of FIG. 5 may additionally include a filter 54 to perform a gain-flattening function like that performed by filter 23 of the module of FIG. 2. The filter 54, though represented separately from the waveguide optical amplifiers 51 and 53 in FIG. 5 as a single integer, in practice may be constituted in two parts, one incorporated within each of those amplifiers 51 and 53.

Figure 5:
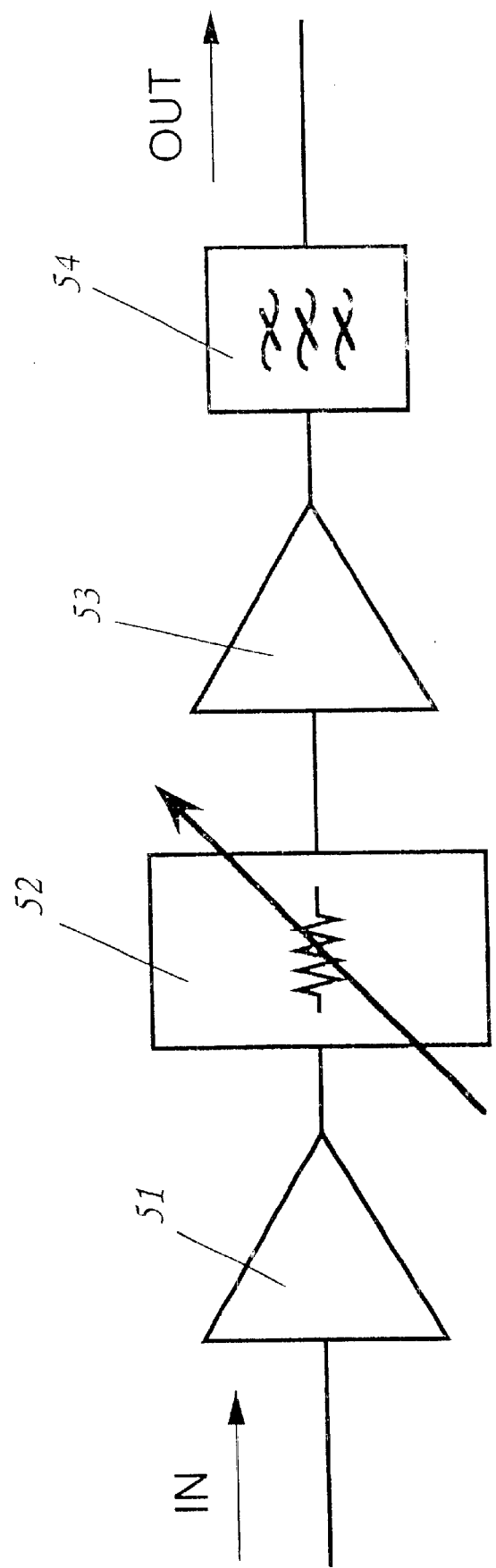
FIG. 5 is a block diagram of an alternative example of one of the optical amplifier modules of the transmission system of FIG. 1.

Clearly the use of fixed gain waveguide amplifiers 51 and 53 in the amplifier module of FIG. 5 will circumvent the problem of gain tilt in just the same manner that it is circumvented in the amplifier module of FIG. 2. If at a wavelength, $\lambda_1$, the ratio of the input to output powers for waveguide amplifier 51 is $G_1$, and if the corresponding ratio for the waveguide amplifier 53 is $G_2$, then the aggregate gain of the two waveguide amplifiers of the module is the product $G_1 \times G_2$. (Correspondingly, if the gains of the individual waveguide amplifiers had been expressed in dBs, then the aggregate gain (also expressed in dBs) will be the sum of the individual gains expressed in dBs.)

When an amplifier module as depicted in FIG. 5 is in use, the conditions of operation may change so much as to make it desirable to be able to alter the gain of the upstream waveguide amplifier 51, increasing its gain if the level of input signal power is particularly low, or decreasing it if the level is so high as to run the risk of producing saturation effects in the waveguide amplifier. Within the teaching of the present invention, this is entirely possible, provided that a complementary adjustment is made to the gain of the other waveguide amplifier. This complementary adjustment is such that if the gain at some wavelength, $\lambda_1$, of the waveguide amplifier 51 is change by some factor, k, then the gain at wavelength, $\lambda_1$, of waveguide amplifier 53 must be changed by the factor, 1/k. In this way the aggregate gain of the amplifier module is maintained constant while the partitioning of the gain between the waveguide amplifiers 51 and 53 is changed. One of the results of the dominance of homogeneous gain broadening is that changes in the partitioning of the gain between the waveguide amplifiers, while maintaining constant their aggregate gain, leaves the spectral gain characteristic of the amplifier module unchanged.

Figure 6:
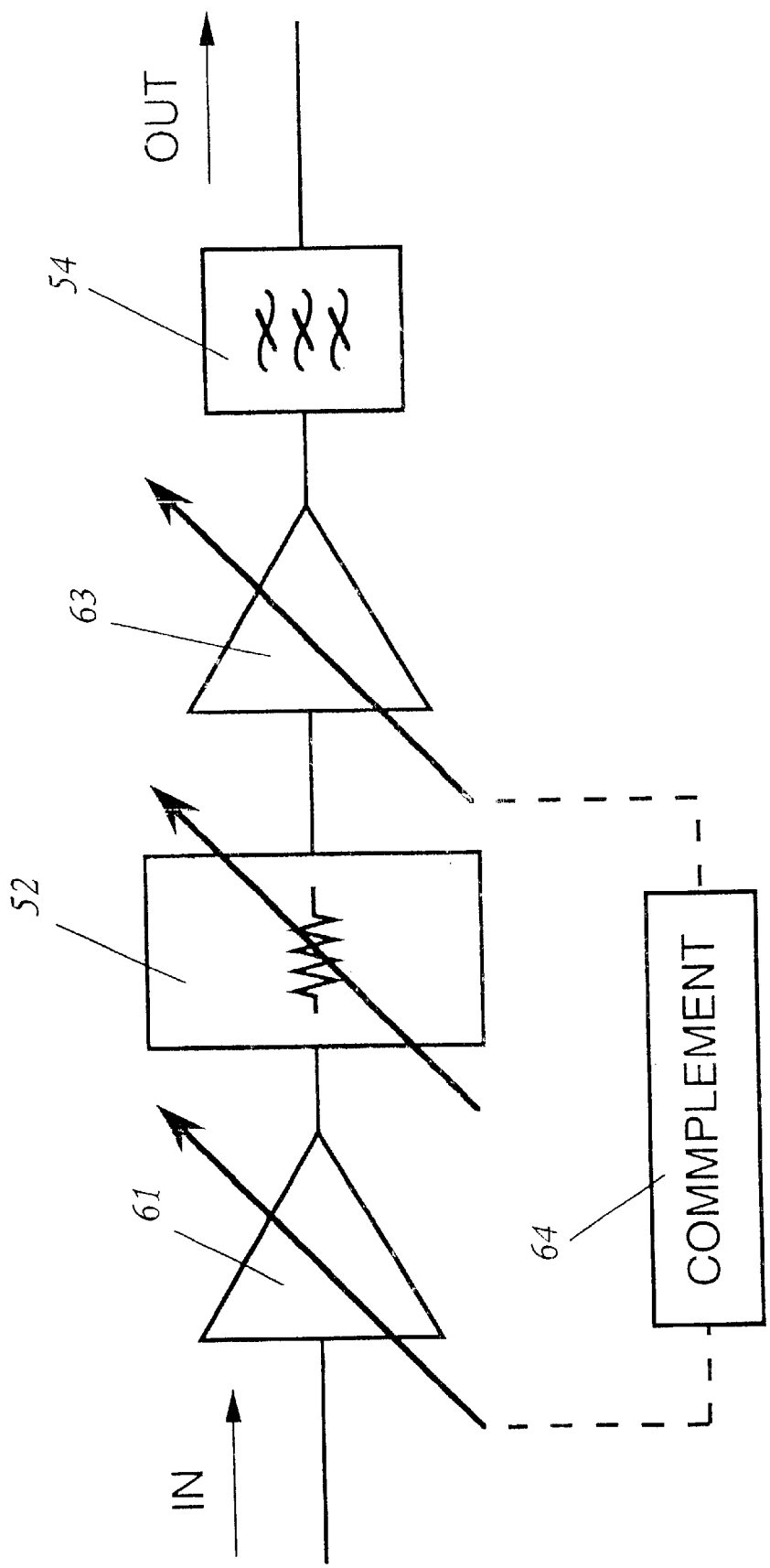
FIG. 6 is a block diagram of a modified form of the amplifier module of FIG. 5.

FIG. 6 depicts the amplifier module of FIG. 5 modified by the replacement of the fixed gain waveguide amplifiers 51 and 53 by variable gain waveguide amplifiers 61 and 63. These variable gain waveguide amplifiers are depicted as being indirectly ganged via an element 64 that functions to provide the requisite complementary relationship between the values of gains at wavelength, $\lambda_1$, that they provide.

The foregoing analysis in respect of an amplifier module having two waveguide amplifiers respectively with gains $G_1$ and $G_2$ can be developed to apply in respect of the more general case of an amplifier module having n waveguide amplifiers with gains $G_1, G_2, G_3, \ldots G_n$ at some wavelength, $\lambda_1$. Arranging to maintain constant the aggregate of all the gains $\pi_{a=1}^{a=n} G_a$, will similarly ensure that the gain spectrum of the amplifier module will remain constant (i.e. will not suffer from the problems of gain tilt) under changes in the partitioning of the gain between the component waveguide amplifiers of the module.

Figure 7:
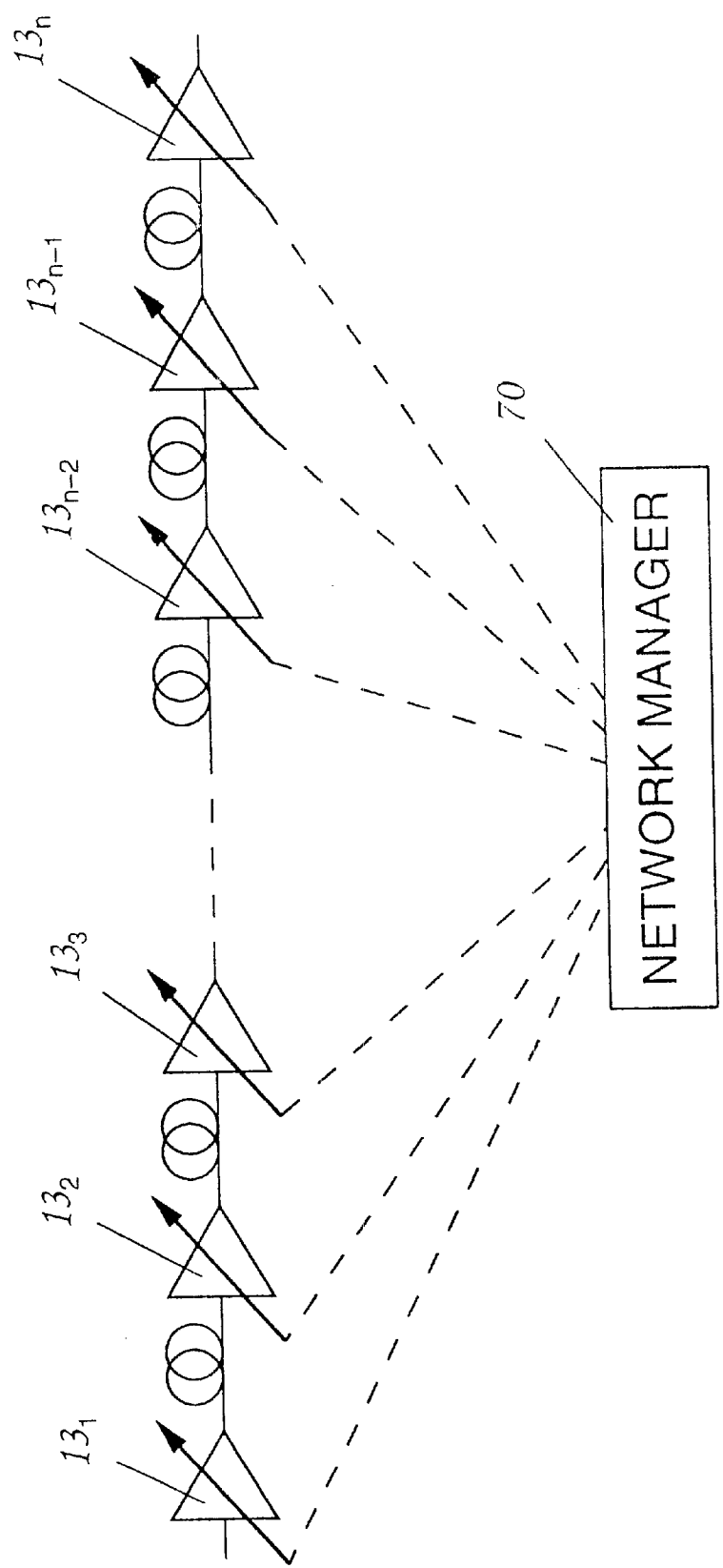
FIG. 7 is a block diagram of a particular form of concatenation of amplifiers of the transmission system of FIG. 1.

Developing further upon the foregoing, and noticing that there is no requirement for all the waveguide amplifiers to be at the same physical location, it can be seen that in respect of a concatenation of the amplifier modules 13 of FIG. 1, a concatenation as depicted more particularly in FIG. 7 and comprising amplifier modules $13_1, 13_2, 13_3, \ldots 13_{n-2}, 13_{n-1}$ and $13_n$, with aggregate module gains $GM_1, GM_2, GM_3, \ldots GM_{n-2}, GM_{n-2}$ and $GM_n$. Provided that the concatenation aggregate of all these aggregate gains, $\pi_{a=1}^{a=n} GM_a$, is constant, the partitioning of the aggregate gain between these individual modules can be changed to suit changes in operating conditions without changing the overall gain spectrum of the concatenation. This partitioning is effected under the control of a network manager 70.

What is claimed is:

1. A variable gain amplifier module having a gain spectrum in which homogeneous broadening is dominant, which amplifier module includes at least two optical gain-providing regions and at least one loss-providing region, wherein the loss provided by said at least one loss-providing region is substantially uniform across the gain spectrum and is electrically variable, and wherein the amplifier module includes gain regulation means adapted to maintain substantially constant the spectral gain characteristic of the amplifier module by maintaining substantially constant, at a selected wavelength within the gain spectrum of the amplifier module, the aggregate gain of all the gain-providing regions of the amplifier module.

2. An amplifier module as claimed in claim 1, wherein the gain provided by each one of all said optical gain-providing regions is substantially constant.

3. An amplifier module as claimed in claim 1, wherein the said at least two gain-providing regions consists of two gain-providing regions, and said at least one variable loss-providing region consists of one variable loss-providing region located optically between said two gain-providing regions.

4. A wavelength division multiplexed transmission system having a concatenation of optical amplifier modules in a transmission path between a transmitter and a receiver, each of which amplifier modules of the concatenation is an amplifier module as claimed in claim 1.

5. A wavelength division multiplexed transmission system having a concatenation of optical amplifier modules in a transmission path between a transmitter and a receiver, each of which amplifier modules of the concatenation is an amplifier module as claimed in claim 3.

6. A method of operating a variable gain amplifier module having a gain spectrum in which homogeneous broadening is dominant, and which amplifier module includes at least two optical gain-providing regions and at least one loss-providing region, wherein the loss provided by said at least one loss-providing region is substantially uniform across the gain spectrum and is electrically variable, in which method of operating the amplifier module substantial invariance of the spectral gain characteristic of the amplifier module is maintained by maintaining substantially constant, at a selected wavelength within the gain spectrum of the amplifier module, the aggregate gain of all the gain-providing regions of the amplifier module.

7. A wavelength division multiplexed transmission system having a concatenation of optical amplifier modules in a transmission path between a transmitter and a receiver, each of which amplifier modules of the concatenation is a variable gain amplifier module having a gain spectrum in which homogeneous broadening is dominant, each containing at least one optical gain-providing region and at least one loss-providing region, wherein the loss provided by said at least one loss-providing region is substantially uniform across the gain spectrum and is electrically variable, wherein the concatenation includes gain regulation means adapted to maintain, under changes in the partitioning of the gain between the individual amplifier modules of the concatenation, substantially constant the spectral gain characteristic of the concatenation by maintaining substantially constant, at a selected wavelength within the gain spectrum of the amplifier modules, the aggregate gain of all the optical gain-providing regions of the concatenation.

8. In a wavelength division multiplexed transmission system having an optical transmitter optically coupled with an optical receiver via a transmission path that includes a concatenation of optical amplifier modules having a gain spectrum in which homogeneous broadening is dominant, each containing at least one optical gain-providing region and at least one loss-providing region that provides a loss that is substantially uniform across the gain spectrum of the gain-providing regions and is electrically variable, a method of operating the concatenation to provide it with a substantially invariant spectral gain characteristic by regulating the gain, at a selected wavelength within the gain spectrum of the concatenation, of the amplifier modules of the concatenation so as to maintain, under changes in the partitioning of the gain between the individual amplifier modules of the concatenation, the aggregate gain of all the optical gain-providing regions of the concatenation.

9. An amplifier module as claimed in claim 1, wherein said gain providing regions comprise rare-earth doped optical wave-guide optical amplifiers.

10. An optical amplifier module having optically in series a first optical wave-guide amplifier providing a predetermined level of gain, a variable optical attenuator adapted to provide variable optical attenuation, and a second optical wave-guide amplifier providing a predetermined level of gain, said optical amplifiers exhibiting gain tilt under variable gain operating conditions wherein the overall gain provided by said optical amplifier module is regulated by regulation of the optical attenuation provided by said optical attenuator.

11. An optical amplifier module as claimed in claim 10, wherein the optical amplifiers are rare-earth doped optical amplifiers.

12. An optical amplifier module as claimed in claim 10, wherein the optical amplifiers are erbium doped optical amplifiers.

13. An optical amplifier module as claimed in claim 10, further including gain regulation means adapted to regulate the gain provided by the amplifier module by regulating said optical attenuator.

14. An optical amplifier module as claimed in claim 10, further including gain regulation means adapted to regulate the gain provided by the amplifier module by regulating said optical attenuator, wherein said gain regulation means provides a feed-forward regulation.

15. An optical amplifier module as claimed in claim 10, further including gain regulation means adapted to regulate the gain provided by the amplifier module by regulating said optical attenuator, wherein said gain regulation means provides a feed-back regulation.

16. An optical amplifier module as claimed in claim 13, wherein said amplifier module has a gain spectrum in which homogenous broadening is dominant, wherein said amplifier module is arranged such that the optical amplification is split between two parts to enable, in the case where an adjustment of the gain of one of said first or said second optical wave-guide optical amplifier is performed, for said second or said first optical wave-guide optical amplifier respectively to be provided with a complimentary adjustment at a selected wavelength; wherein said gain regulation means is adapted to maintain substantially constant the spectral gain characteristic of the amplifier module by maintaining substantially constant, at a selected wavelength within the gain spectrum of the amplifier module, the aggregate gain of the optical amplifiers.

* * * * *